US012752142B2

(12) United States Patent
Cerrano et al.

(10) Patent No.: US 12,752,142 B2
(45) Date of Patent: Oct. 6, 2026

(54) FIRE-FIGHTING SYSTEM

(71) Applicant: Hale Products, Inc., Ocala, FL (US)

(72) Inventors: Jason Cerrano, Lake St. Louis, MO (US); Michael A. Laskaris, Collegeville, PA (US)

(73) Assignee: Hale Products, Inc., Ocala, FL (US)

( * ) Notice: Subject to any disclaimer, the term of this patent is extended or adjusted under 35 U.S.C. 154(b) by 190 days.

(21) Appl. No.: 18/712,680

(22) PCT Filed: Nov. 22, 2021

(86) PCT No.: PCT/US2021/060326
§ 371 (c)(1),
(2) Date: May 22, 2024

(87) PCT Pub. No.: WO2023/091150
PCT Pub. Date: May 25, 2023

(65) Prior Publication Data

US 2025/0018238 A1 Jan. 16, 2025

(51) Int. Cl.

| | |
|---|---|
| ***A62C 37/50*** | (2006.01) |
| ***A62C 27/00*** | (2006.01) |
| ***A62C 31/24*** | (2006.01) |
| ***A62C 37/10*** | (2006.01) |

(52) U.S. Cl.
CPC .............. *A62C 37/50* (2013.01); *A62C 27/00* (2013.01); *A62C 31/24* (2013.01); *A62C 37/10* (2013.01)

(58) Field of Classification Search
CPC ......... A62C 27/00; A62C 31/24; A62C 37/00; A62C 37/09; A62C 37/10; A62C 37/50
See application file for complete search history.

(56) References Cited

U.S. PATENT DOCUMENTS

| | | | | |
|---|---|---|---|---|
| 9,399,151 | B1 | 7/2016 | Combs et al. | |
| 2004/0199302 | A1 | 10/2004 | Pillar et al. | |
| 2006/0065411 | A1* | 3/2006 | Linsmeier ............. | A62C 27/00 169/24 |
| 2009/0101368 | A1 | 4/2009 | Lozier | |
| 2013/0119167 | A1 | 5/2013 | Trapp et al. | |
| 2016/0271433 | A1 | 9/2016 | Lozier et al. | |
| 2021/0236865 | A1* | 8/2021 | Hut ........................ | A62C 37/36 |
| 2022/0305315 | A1* | 9/2022 | Dusing .................. | A62C 31/28 |
| 2022/0401773 | A1* | 12/2022 | Staszak .................. | A62C 31/28 |

FOREIGN PATENT DOCUMENTS

CN 108525176 A * 9/2018 ............. A62C 37/00

OTHER PUBLICATIONS

English Language Translation of CN-108525176-A (Year: 2018).*
International Search Report and Written Opinion of the International Searching Authority issued in PCT/US21/60326 mailed on Mar. 25, 2022, pp. 1-15.

* cited by examiner

*Primary Examiner* — Darren W Gorman
(74) *Attorney, Agent, or Firm* — Armstrong Teasdale LLP

(57) ABSTRACT

A fire-fighting system includes a fluid monitor that includes a fluid outlet and is selectively moveable between a stowed configuration and a deployed configuration. The system further includes a controller configured to receive a request to direct a fluid flow from the fluid monitor towards a desired target area, determine whether the fluid monitor is in a proper position to direct the fluid flow toward the target area, and control the fluid flow from the fluid monitor through the fluid outlet based on the determination.

19 Claims, 11 Drawing Sheets

FIG. 7

FIRE-FIGHTING SYSTEM

CROSS REFERENCE TO RELATED APPLICATIONS

This application is a National Stage application of International Application No. PCT/US2021/060326 filed on Nov. 22, 2021, the disclosure of which is hereby incorporated by reference in its entirety.

BACKGROUND

The present disclosure relates generally to control systems and, more specifically, to control systems for use in controlling a fire-fighting device.

Fire-fighting pumper trucks (broadly referred to herein as a "fire-fighting device") are used to fight fires by pumping fluid (e.g., water, foam, or another flame retardant) from a source through hose lines wherein the fluid may be directed (i.e., sprayed) on a fire to facilitate the extinguishing or containing the fire. Known pumper trucks include control systems used to regulate the operation of the truck and to control the flow of fluid from the truck into the hose lines. Such control systems generally include a plurality of valves used to control the flow of fluid to a fire pump from a storage tank transported onboard the truck or from another fluid supply source (e.g., a fire hydrant). The valves also facilitate control of the flow of fluid from the fire pump to fire hoses or other discharge devices. Known control systems include pressure and flow rate sensors used to monitor the pressure and flow rate of fluid at various locations within the pumper truck. For example, pressure sensors may monitor the pressure of the fluid received by the fire pump from the supply source. Generally, the pumper truck controls used to regulate the valves and the fire pump are commonly positioned in a control panel on the side of the pumper truck.

Fire-fighting systems may incorporate fluid monitors, also referred to as "water monitors," "water turrets," "water cannons," "fire-fighting monitors," to distribute high-pressure streams of foam, water, water-based foam and fire retardants over an area determined by the amount of fluid pressure and the angle of elevation of the water monitor. Water monitors are primarily used to extinguish fire hazards, although other uses may include fire prevention, irrigation, crowd control, and water-cooling of objects.

Some known fire-fighting systems allow for control of a position of the fluid monitors to be controlled remotely. For example, in some known systems, a firefighter may use a remote to accurately adjust a position of the monitor. During operation when arriving on a scene, the firefighter may use the controls to manually move the fluid monitor into position towards a target area. As a result, a dedicated operator must watch and control the remote controller for the monitor while it is deploying and is prevented from engaging in other tasks. Additionally, such systems rely on the firefighter to visually observe an orientation of the monitor and predict a trajectory of the fluid flow from the monitor, which is often difficult from their vantage point.

Additionally, remote controls for monitors have traditionally been limited to adjusting a position of the monitors and/or spray characteristics at the nozzle. As a result, during operation, to control the fluid pressure at a monitor, the firefighter controlling the monitor position verbally communicates to an engineer (typically via a hand-held radio) any desired changes in the flow rate and/or pressure of liquid delivered to the monitor. In response, the engineer manually adjusts the controls to enable the desired change in the flow rate and/or pressure of liquid delivered through the hose to be achieved.

Accordingly, known control systems rely on the engineer to translate and execute orders communicated by a firefighter, and in response, to manipulate the controls of the pumper truck. Reliance on the engineer increases both the cost of operations and introduces the possibility of human error. For example, one issue common to known systems is that the engineer may open flow from the monitor prior to the monitor being fully deployed. Such errors can result in increased costs and/or damage to fire-fighting equipment and such errors may pose a safety hazard to firefighters at the site. As used herein, the term "engineer" refers to a firefighter generally positioned at a firefighting device whose role relates to controlling operation of the firefighting device.

BRIEF DESCRIPTION

In one aspect, a fire-fighting system includes a fluid monitor that includes a fluid outlet and is selectively moveable between a stowed configuration and a deployed configuration. The system further includes a controller configured to receive a request to direct a fluid flow from the fluid monitor towards a desired target area, determine whether the fluid monitor is in a proper position to direct the fluid flow toward the target area, and control the fluid flow from the fluid monitor through the fluid outlet based on the determination.

In another aspect, a controller for controlling a fire-fighting system that includes a fluid monitor that is moveable between a stowed configuration and a deployed configuration is configured to receive a request to direct a fluid flow from the fluid monitor towards a desired target area and determine whether the fluid monitor is in the deployed configuration with a fluid outlet of the fluid monitor oriented to direct the fluid flow towards the requested target area. The controller is further configured to control the fluid monitor to cause the fluid monitor to discharge fluid when the fluid monitor is in the deployed configuration and control the fluid monitor to prevent discharge of fluid if the fluid monitor is not in the deployed configuration.

In yet another aspect, a method of controlling a fluid monitor of a fluid monitor of a fire-fighting device, where the fluid monitor is moveable between a stowed configuration and a deployed configuration, includes receiving, at a controller, a request for a fluid flow from the fluid monitor towards a desired target area and determining whether the fluid monitor is in the deployed configuration with a fluid outlet of the fluid monitor oriented to direct the fluid flow towards the requested target area. The method further includes controlling the fluid monitor to cause the fluid monitor to discharge the fluid when the fluid monitor is in the deployed configuration and controlling the fluid monitor to prevent discharge of fluid if the fluid monitor is not determined to be in the deployed configuration.

In yet another aspect a fire-fighting system includes a pump and a fluid monitor that includes a mount, a body rotatably coupled to the mount, and a flow outlet for directing fluid flow from the pump to a desired target area. The body is rotatable relative to the mount about at least one rotational axis. The system further includes a drive system coupled to the body for controlling a position of the fluid monitor, a valve controlling fluid flow between the pump and the flow outlet, and a controller coupled to the valve, the pump, and the drive system. The controller is configured to receive a request to direct fluid flow from the fluid monitor, the request including a requested fluid pressure and a requested monitor position. The controller is further configured to control operation of at least one of the pump and the valve based on the requested fluid pressure and control the drive system to move the fluid monitor into the requested monitor position.

In yet another embodiment, a method of controlling a fire-fighting system including a pump, a fluid monitor including a flow outlet, and a valve controlling fluid flow between the pump and the flow outlet is provided. The method includes receiving, at a controller, a request to direct a fluid flow from the fluid monitor, the request including a requested fluid pressure and a requested monitor position, controlling operation of at least one of the pump and the valve based on the requested fluid pressure, and controlling a drive system operatively connected to the fluid monitor to move the fluid monitor into the requested monitor position.

In yet another embodiment, a controller is provided for use with a fire-fighting system that includes a pump, a fluid monitor including a flow outlet, and a valve controlling fluid flow between the pump and the flow outlet. The controller is configured to receive a request to direct a fluid flow from the fluid monitor, the request including a requested fluid pressure and a requested monitor position. The controller is further configured to control operation of at least one of the pump and the valve based on the requested fluid pressure and control a drive system operatively connected to the fluid monitor to move the fluid monitor into the requested monitor position.

DETAILED DESCRIPTION

The exemplary systems and methods described herein overcome disadvantages of known fire-fighting control systems by enabling automated control of fluid monitors of a fire-fighting system. For example, some embodiments described herein enable a fire-fighter to select a designated target area around the fire-fighting device and automatically deploy the monitor in response. As a result, the systems and methods described herein facilitate increasing the efficiency of the fire-fighting control system in a cost-effective and reliable manner, while also improving firefighter safety. Additionally, some embodiments described herein prevent fluid discharge from the fluid monitor until the monitor is determined to be in a deployed configuration. Accordingly, the systems described herein improve firefighter safety by reducing the potential for human error.

Figure 1:
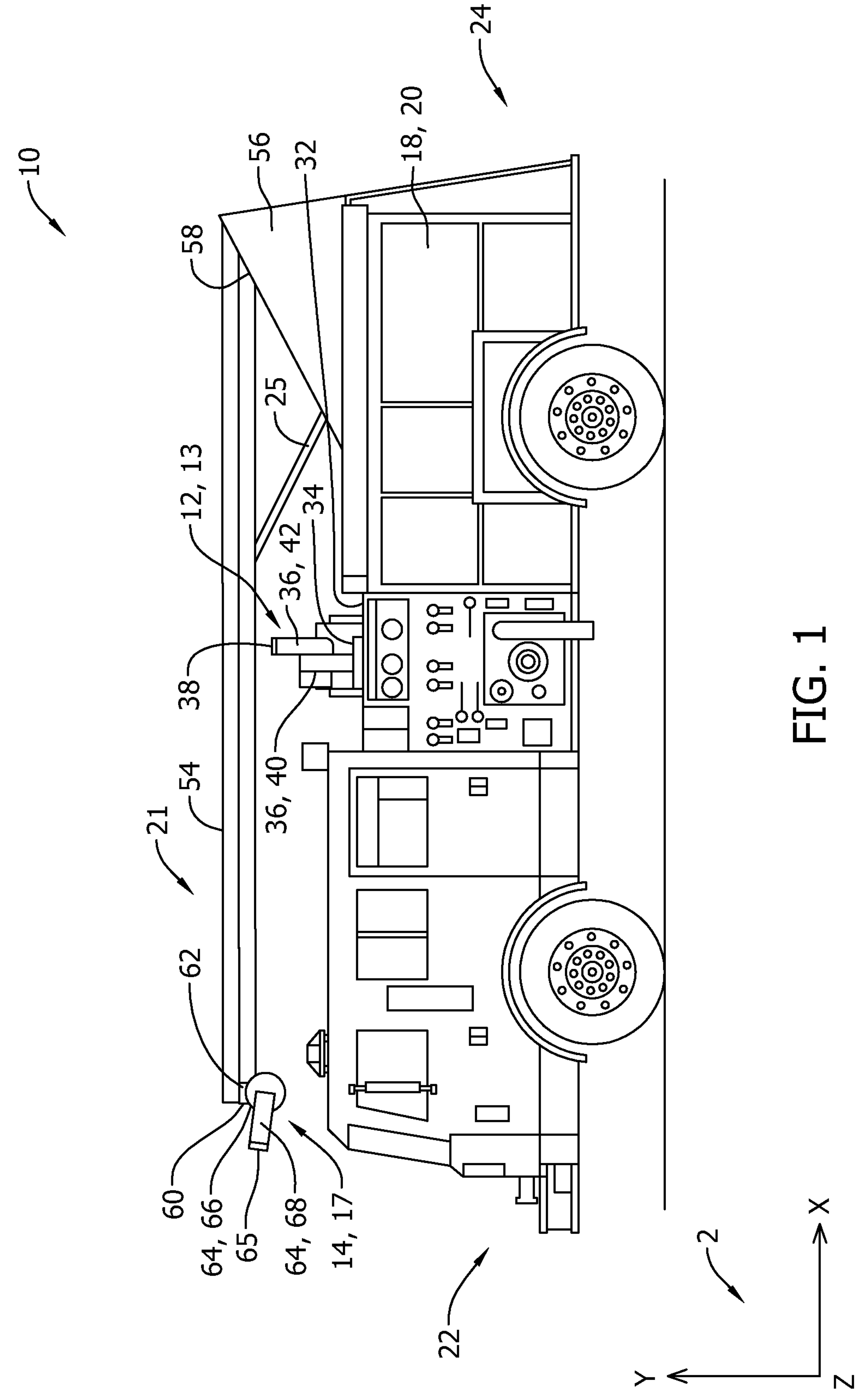
FIG. 1 is a side view of an example fire-fighting system including a first fluid monitor and a second fluid monitor in a stowed configuration.
Figure 2:
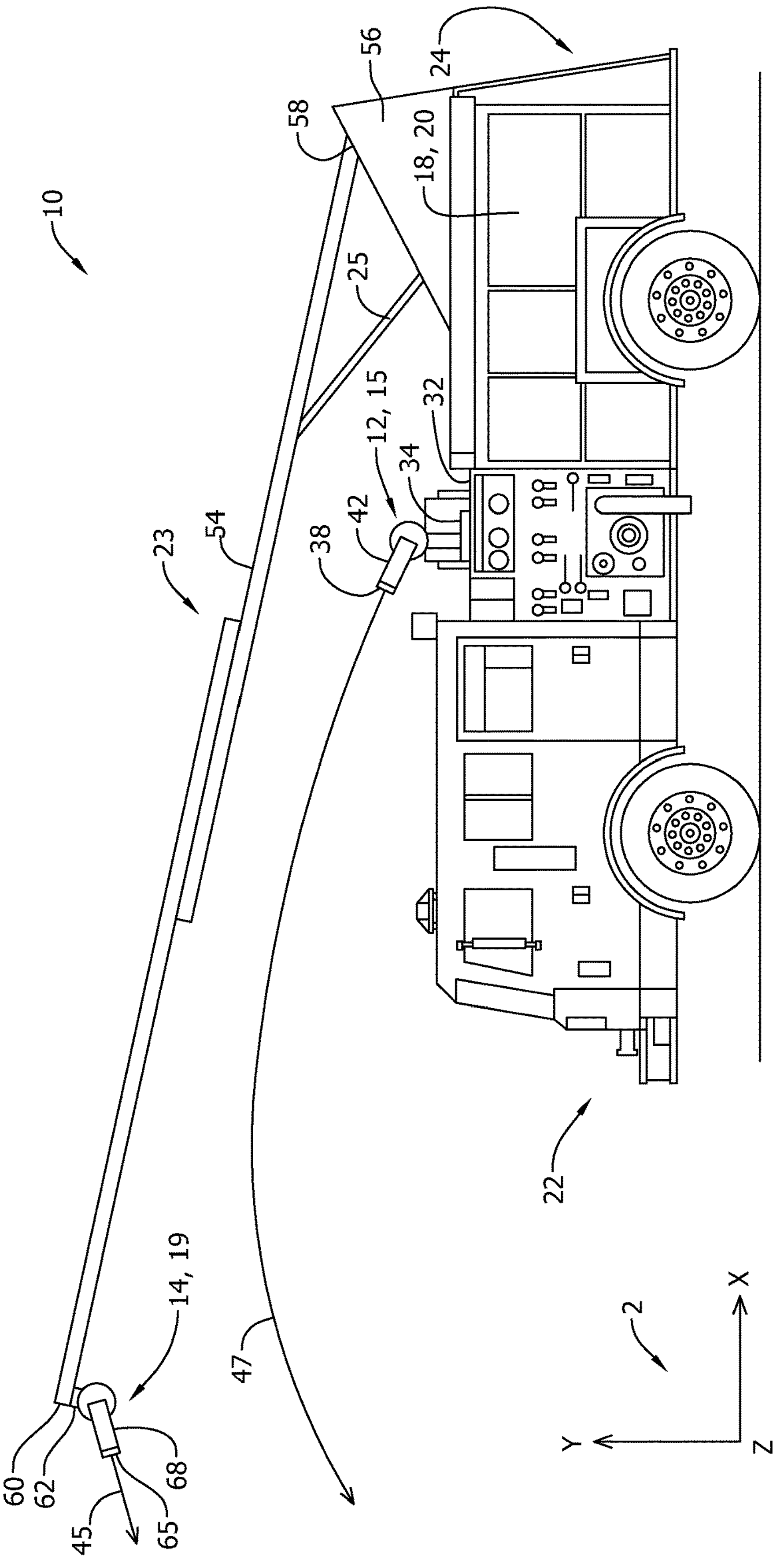
FIG. 2 is a side view of the fire-fighting system shown in FIG. 1, showing the first fluid monitor and the second fluid monitor in a deployed configuration.
Figure 3:
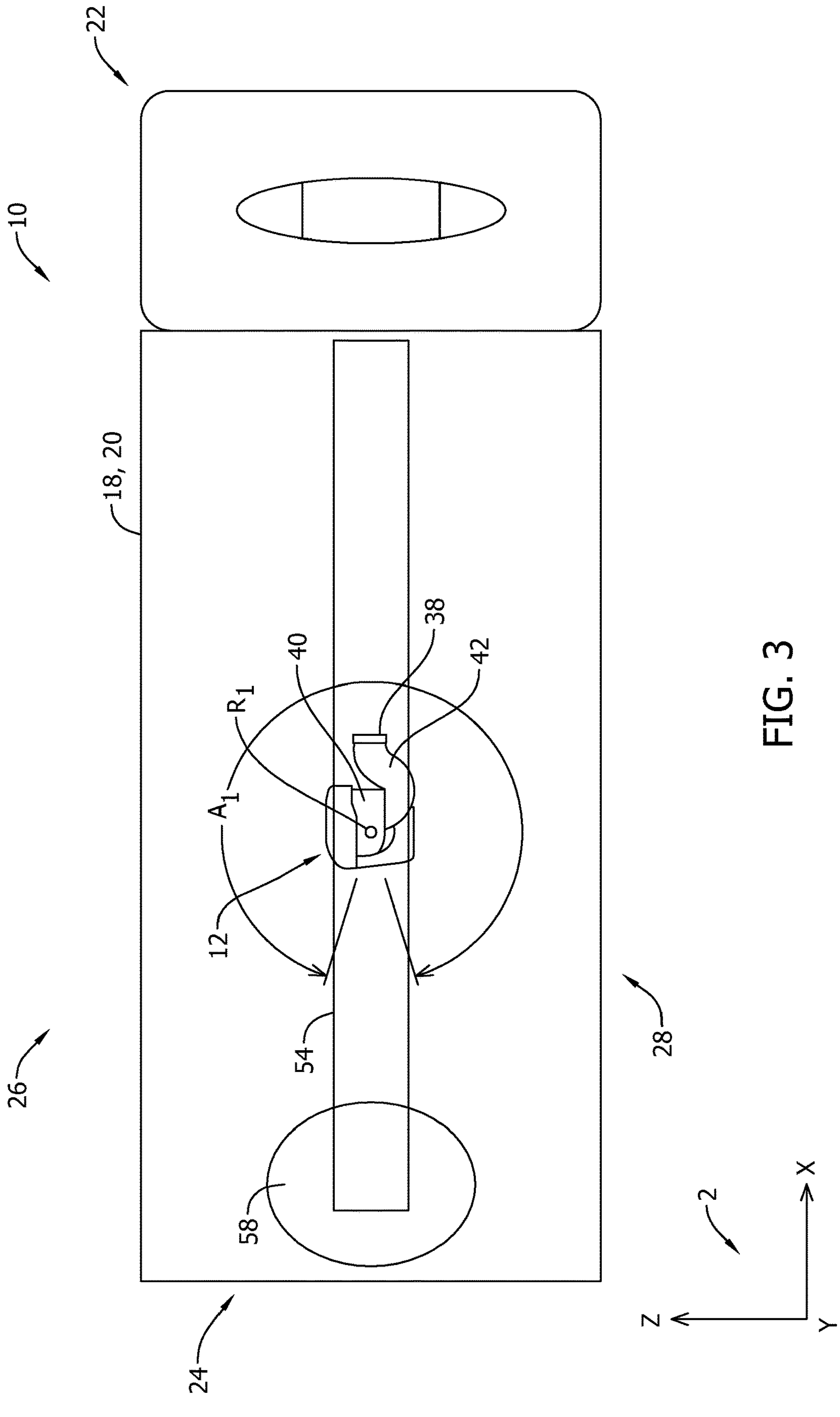
FIG. 3 is a top view of the fire-fighting system shown in FIG. 1.
Figure 4:
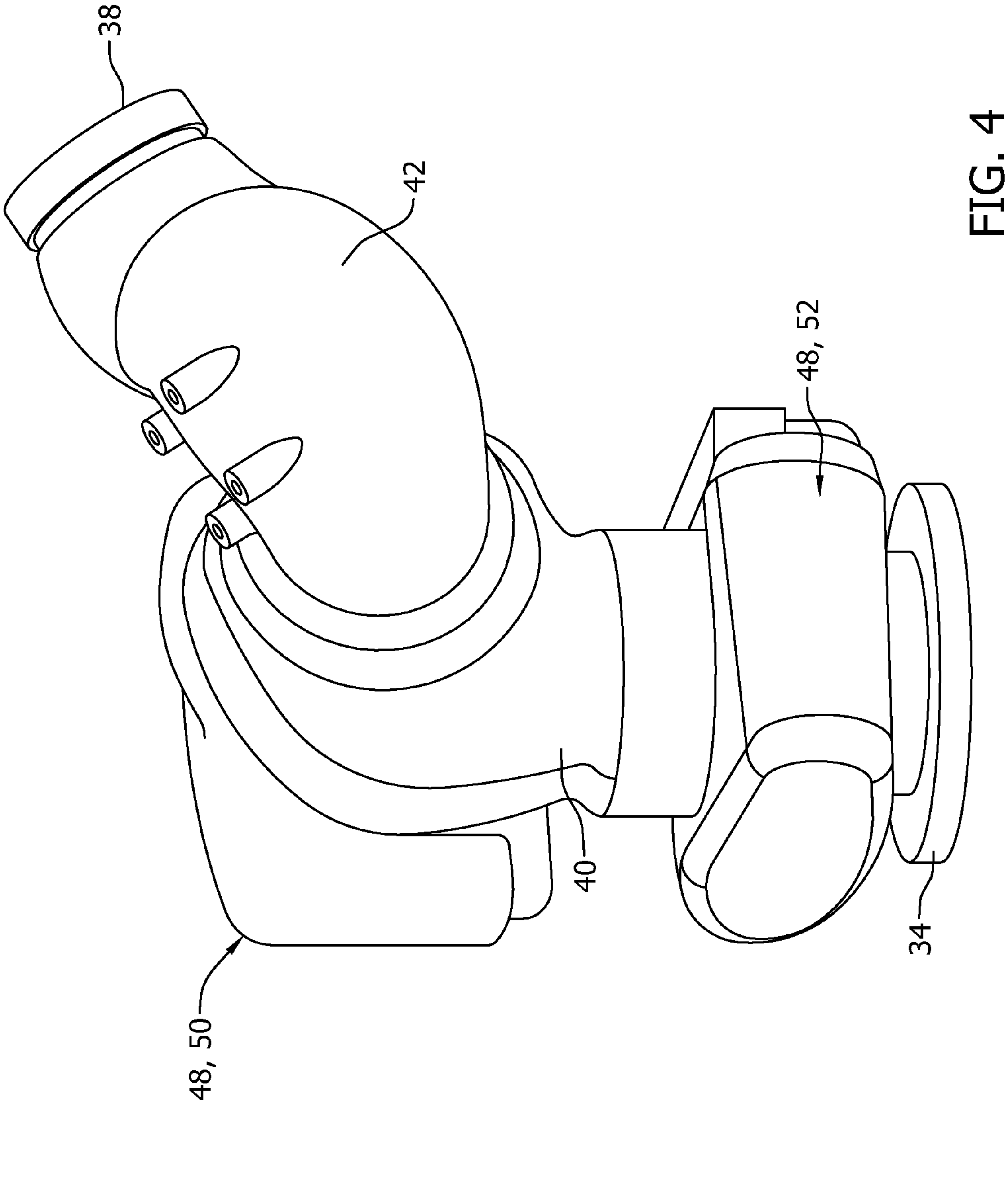
FIG. 4 is a perspective view of an example fluid monitor for use with the fire-fighting system of FIG. 1.

FIG. 1 is a side view of a fire-fighting system 10, showing a first fluid monitor 12 and a second fluid monitor 14 each in a stowed configuration. FIG. 2 is a side view of fire-fighting system 10 and shows first fluid monitor 12 and second fluid monitor 14 in a deployed configuration. FIG. 3 is a top view of fire-fighting system 10. FIG. 4 is a perspective view of an exemplary first fluid monitor 12 for use with fire-fighting system 10. A coordinate system 2 includes an X-axis, a Y-axis, and a Z-axis.

Referring to FIG. 1, in the exemplary embodiment, fire-fighting system 10 includes a fire-fighting device 16 in the form of a vehicle 18 that includes a body 20 having a front end 22 and a rear end 24. A first or left side 26, a second or right side 28, and a top side 30 each extend between the front end 22 and the rear end 24. Although fire-fighting device 16 is depicted schematically as a fire-truck herein, it should be understood that fire-fighting device 16 may include any fire-fighting device and/or vehicle.

In the exemplary embodiment, first fluid monitor 12 is mounted on a roof 32 of vehicle body 20 on top side 30. First fluid monitor 12 includes a mount 34 and a body 36 rotatably coupled to mount 34. Body 36 is rotatable about two axes of rotation relative to first mount 34 to enable selective positioning of a first fluid outlet 38. For example, as shown in FIG. 4, body 36 includes a first body portion 40 rotatably coupled to mount 34, and a second body portion 42 rotatably coupled to first body portion 40. Second body portion 42 extends from first body portion 40 to first fluid outlet 38. Examples of similarly suitable monitors for use in the fire-fighting system 10 are described in U.S. Pat. No. 9,675,826, which is incorporated by reference herein in its entirety.

Referring to FIG. 3, in the exemplary embodiment, first body portion 40 is rotatable relative to mount 34 (FIG. 4) about a first rotational axis $R_1$ that extends parallel to the Y-axis (i.e., into the page on FIG. 3). First body portion 40 carries second body portion 42, which is rotatably coupled to first body portion 40, and first fluid outlet 38 such that rotating first body portion 40 selectively positions first fluid outlet 38 to direct fluid flow towards a desired target area adjacent different sides 22-28 of vehicle 18. In other words, rotating first body portion 40 selectively changes a discharge direction of first fluid monitor 12. First body portion 40 is rotatable to orient first fluid outlet 38 along a first arc $A_1$. In the exemplary embodiment, the first arc $A_1$ spans approximately 355°, though in other embodiments, the first body portion 40 may be rotatable a full 360° about the rotational axis $R_1$, and/or may be rotatable less than 355°.

Figure 5:
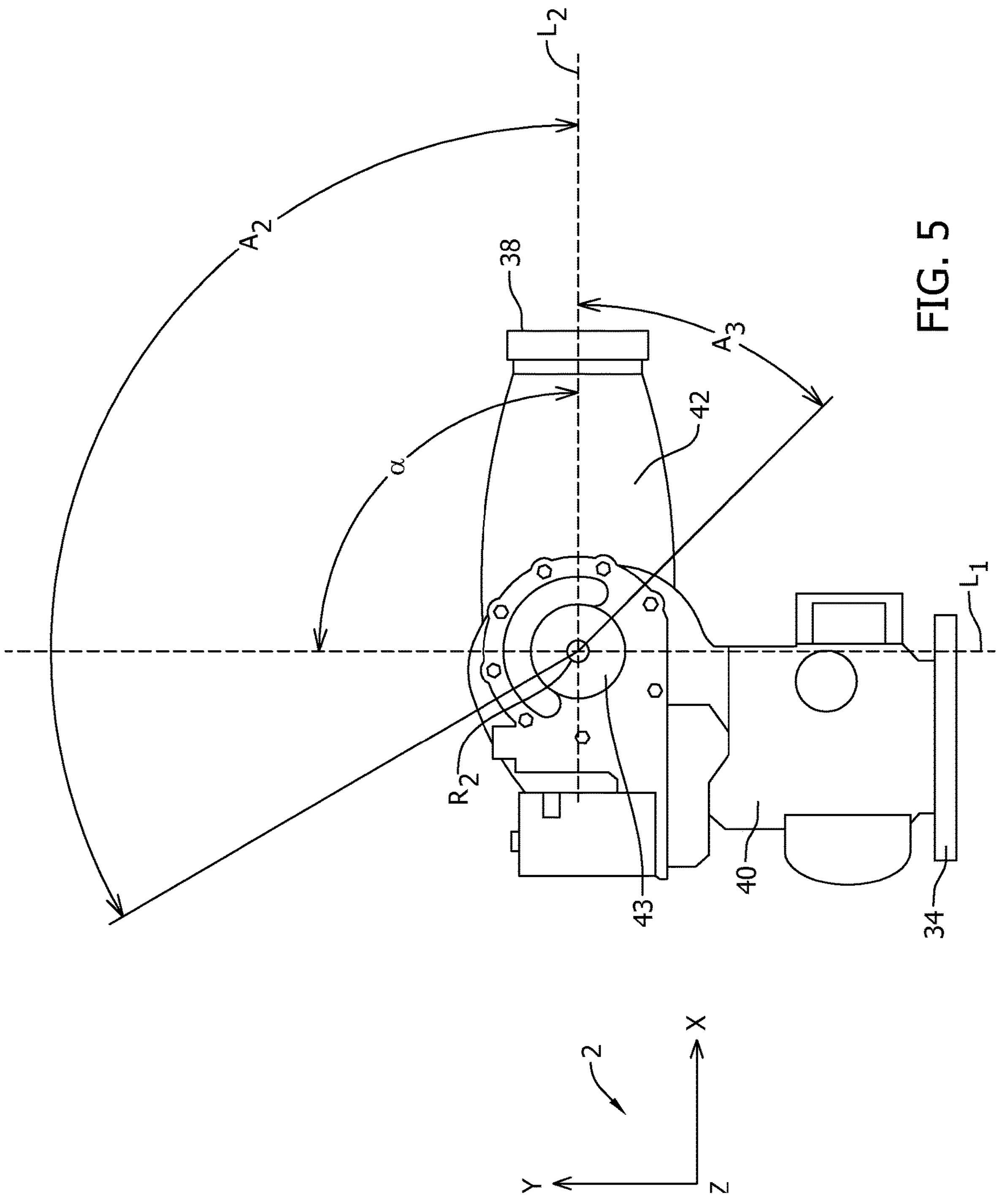
FIG. 5 is a side view of the example fluid monitor shown in FIG. 4.

Referring to FIG. 5, in the exemplary embodiment, first body portion 40 defines a first longitudinal axis $L_1$ extending through mount 34 and a rotatable coupling 43 of first fluid monitor 12. Second body portion 42 defines a second longitudinal axis $L_2$ extending through rotatable coupling 43 and fluid outlet 38. Second body portion 42 is rotatably coupled to first body portion 40 by rotatable coupling 43 to enable rotation of second body portion 42 relative to first body portion 40 about a second rotational axis $R_2$ that extends parallel to the Z-axis (i.e., into the page on FIG. 5). Rotating second body portion 42 relative to first body portion 40 selectively changes a discharge angle α or pitch of first fluid monitor 12, or more specifically, of first fluid outlet 38. In the exemplary embodiment, discharge angle α is defined between first longitudinal axis $L_1$ and second longitudinal axis $L_2$. Second body portion 42 is rotatable relative to first body portion 40 along a second arc $A_2$ above the horizontal X-axis, and along a third arc $A_3$ defined below the X-axis. In the exemplary embodiment, the second arc $A_2$ spans approximately 120° and the third arc $A_3$ spans approximately 45°. In other embodiments, second body portion 42 may be rotatable to any suitable degree relative to first body portion 40.

Referring again to FIG. 4, in the exemplary embodiment, first fluid monitor 12 includes a first drive system 48 operable to cause selective rotation of first fluid monitor 12. In particular, in the exemplary embodiment, first drive system 48 includes a first drive 50 that rotates first body portion 40 relative to mount 34, and a second drive 52 that rotates second body portion 42 relative to first body portion 40. In the exemplary embodiment first drive 50 and second drive 52 are each motors, though in other embodiments, any other suitable drive may be used. In some alternative embodiments, at least one of first body portion 40 and/or second body portion 42 is manually rotatable without the use of a drive. In yet further embodiments, first drive 50 and second drive 52 may be provided as a single assembly.

Referring back to FIGS. 1 and 2, in the exemplary embodiment, first fluid monitor 12 is selectively positionable between a stowed configuration 13 (FIG. 1) that is for transport of vehicle 18, and a deployed configuration 15 (FIG. 2). In the exemplary embodiment, when in the stowed configuration first fluid outlet 38 is oriented to face generally vertically away from the roof 32. In other embodiments the first fluid monitor 12 may have any other suitable orientation when in the stowed configuration 13. For example, in some embodiments the stowed configuration 13 of first fluid monitor 12 may adjusted and/or be set by an operator using the control system 100, as described in greater detail below with respect to FIGS. 6 and 7.

In the deployed configuration 15, the first fluid outlet 38 is positioned to direct the flow of fluid away from the vehicle body 20 and towards a desired target area. In particular, in the exemplary embodiment, to transition first fluid monitor 12 from the stowed configuration 13 to the deployed configuration 15, first rotatable body 40 is rotated approximately 90° relative to mount 34 and second rotatable body 42 is rotated approximately 45° relative to first rotatable body 40. In the deployed configuration 15, fluid outlet 38 is oriented to provide an arced fluid trajectory 47 that extends over vehicle front end 22. In other operations, first fluid monitor 12 may be oriented in other suitable deployed configurations having any suitable discharge direction and/or discharge orientation. For example, and as described in greater detail below with respect to FIGS. 6 and 7, an operator may preset and/or may request different preset deployed configurations using control system 100 to enable fluid flow to be discharged towards different desired target areas relative to vehicle 18.

In alternative embodiments, first fluid monitor 12 may be a portable fluid monitor that may be selectively positioned at a site spaced from the truck 102. For example, in some such embodiments, fire-fighting system 10 further includes a portable monitor stand (not shown) for supporting the monitor at a position spaced from vehicle body 20 and resist monitor movement caused by the reaction force associated with the fluid exiting the monitor. One example of such a monitor is described in U.S. Pat. No. 10,864,396, which is hereby incorporated by reference in its entirety.

In the exemplary embodiment, second fluid monitor 14 is coupled to a boom 54 of fire-fighting device 16. In particular, in such an embodiment, second monitor is an "aerial monitor," in that is carried by, or is moved concurrently with, boom 54, as boom 54 is moved relative to truck body 20. In the exemplary embodiment, boom 54 is a turntable ladder that is pneumatically or hydraulically powered and that is capable of being selectively telescoped between a retracted position 21 (shown in FIG. 1) and an extended position 23 (shown in FIG. 2). In the retracted position 21, boom 54 is lowered towards vehicle roof 32 and is fully retracted such that boom 54 is oriented substantially parallel to the X-axis to provide a reduced vertical clearance of vehicle 18. In the extended position 23, boom 54 is extended outwardly from the vehicle 18 and is elevated relative to roof 32 to enable second fluid monitor 14 to be selectively positioned at a desired elevated position above roof 32.

In the exemplary embodiment, boom 54 is coupled to a turntable 56. Turntable 56 is selectively rotatable about the vertical Y-axis to enable boom 54 to swing outwardly from vehicle body 20 and to selectively position second fluid monitor 14 near a desired target area. In further alternative embodiments, boom 54 may be any other selectively extendable support that enables fire-fighting system 10 to function as described herein. A hydraulic lift 25 extends between turntable 56 and boom 54. Hydraulic lift 25 is selectively extendable to raise boom 54, and in particular, second end 60 of boom, relative to vehicle 18.

Boom 54 extends between a first end 58, coupled to turntable 56, and an opposed second, or distal end 60. Second fluid monitor 14 is coupled to boom 54 at second end 60. In some alternative embodiments, boom 54 also includes an operator platform (not shown) at second end 60 for carrying an operator. In the exemplary embodiment, second fluid monitor 14 is substantially identical to first fluid monitor 12 except that second fluid monitor 14 is mounted to second end 60 of boom 54. Second fluid monitor 14 includes a body 64 that is rotatable about two axes of rotation relative to a mount 62 to enable selective positioning of a second fluid outlet 65 in substantially the same manner as first fluid monitor 12. In particular, body 64 is rotatable to selectively change a discharge direction and discharge angle of second fluid monitor 14 (e.g., similar to discharge angle α of first fluid monitor 12, shown in FIG. 5). In the exemplary embodiment, body 64 includes a first body portion 66 that is rotatably coupled to mount 62, and a second body portion 68 that is rotatably coupled to first body portion 66. In alternative embodiments, body 64 is rotatable about only a single axis of rotation, such as the Z-axis.

Second fluid monitor 14 is selectively positionable between a stowed configuration 17 (FIG. 1) and a deployed configuration 19 (FIG. 2). In the stowed configuration 17, boom 54 is in the retracted position 21 and second fluid monitor 14 is oriented to face outward from front end 22 of vehicle 18 with a discharge angle α oriented generally parallel to or obliquely above the horizontal X-axis. As shown in FIG. 2, in the deployed configuration 19, boom 54 is elevated relative to vehicle 18, positioned in the extended position 23, and second body portion 68 is rotated (e.g., counter clockwise in FIGS. 1 and 2) such that the discharge angle α is oriented downwardly to provide a downward fluid trajectory 45.

Figure 6:
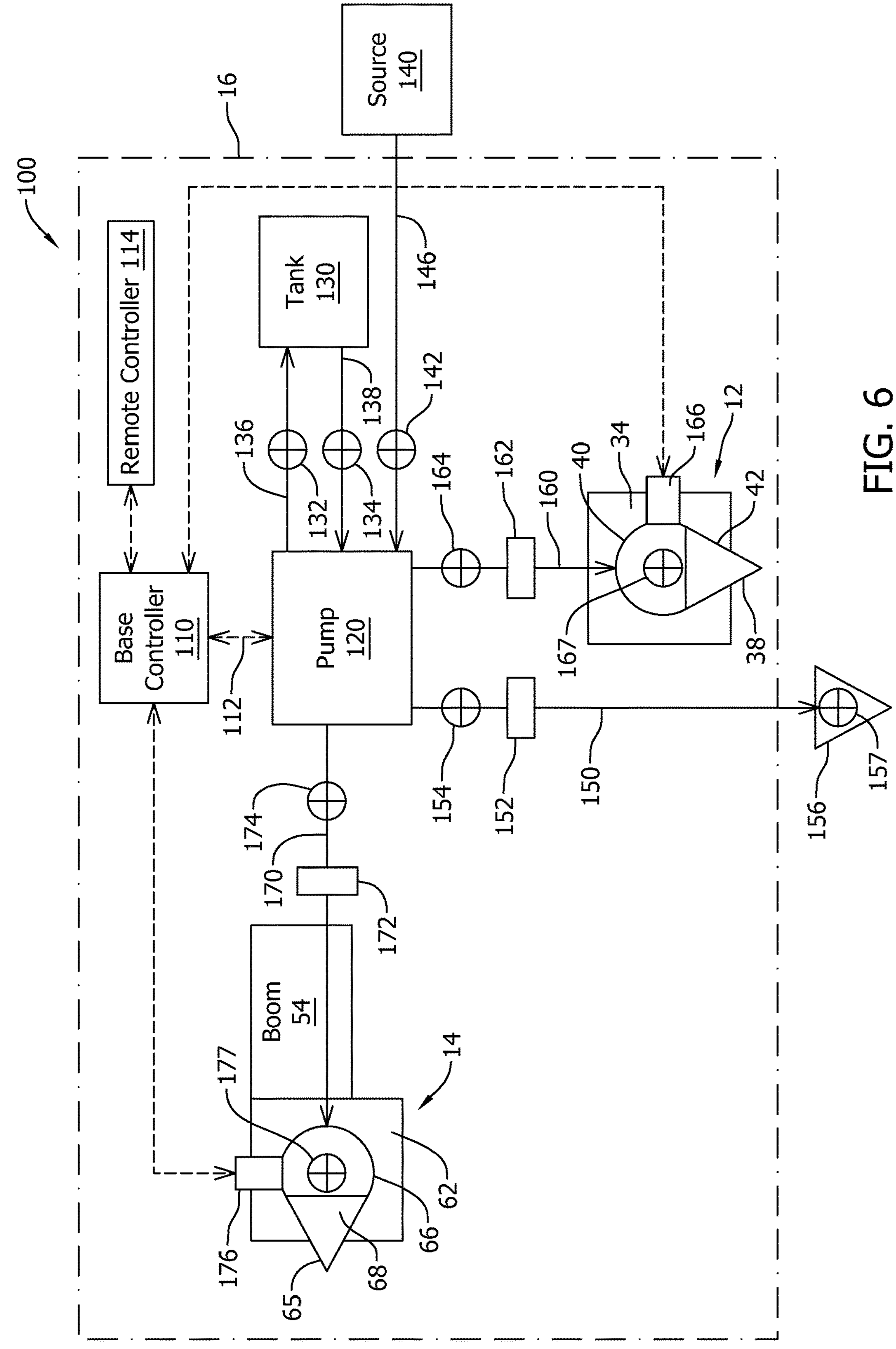
FIG. 6 is a schematic view of an example fire-fighting control system for controlling the fire-fighting system of FIG. 1.
Figure 7:
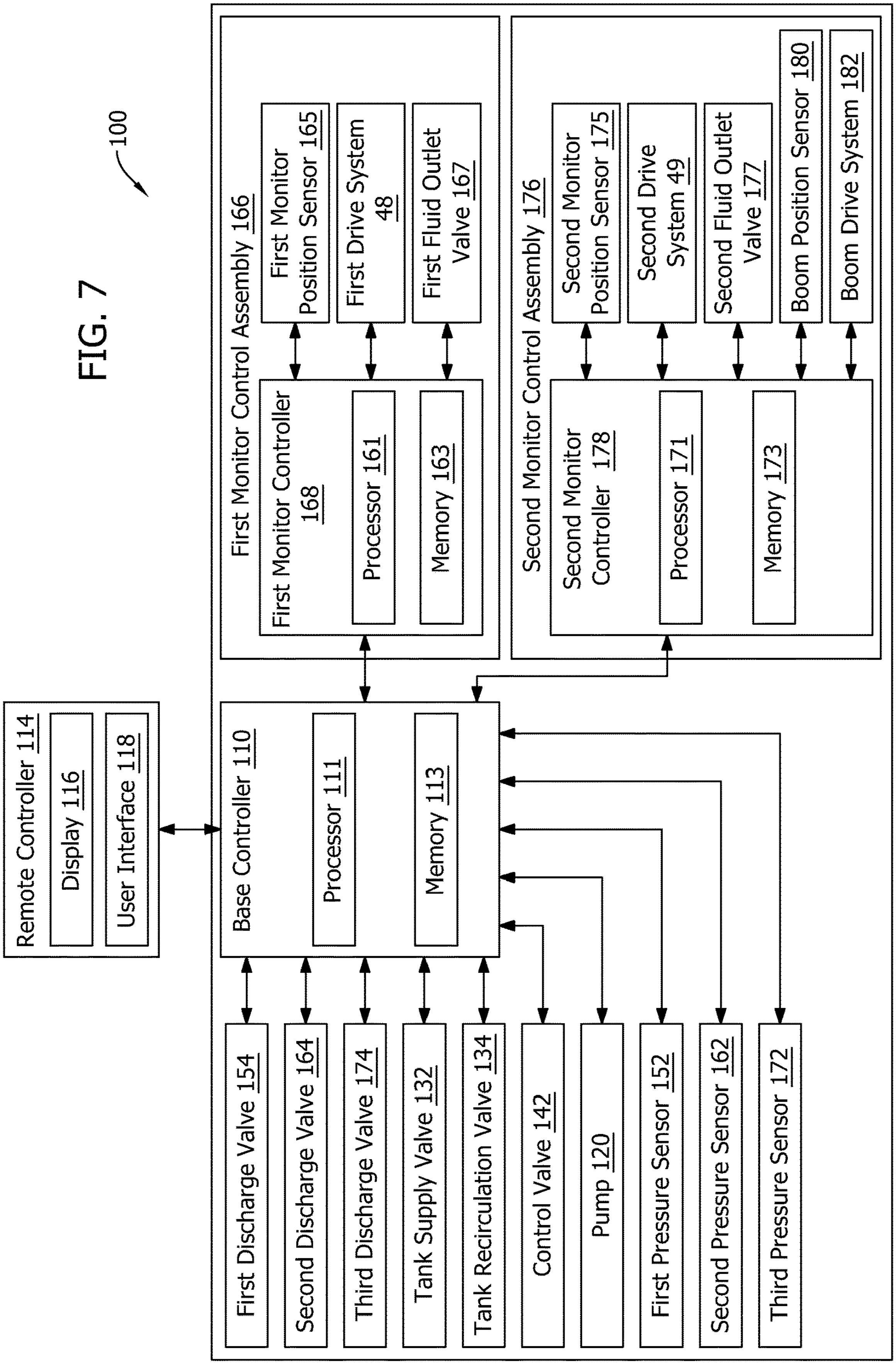
FIG. 7 is a schematic view of a portion of the fire-fighting system shown in FIG. 6.

FIG. 6 is a schematic view of an exemplary fire-fighting control system 100 for use in controlling fire-fighting system 10 (FIG. 1). FIG. 7 is a schematic view of a portion of fire-fighting system control system 100.

In the exemplary embodiment, control system 100 includes a base controller 110 that is coupled via a communication link 112 to a pump 120. A tank 130 and a fluid source 140 are also coupled to pump 120. A remote controller 114 is communicatively coupled to base controller 110. In the exemplary embodiment remote controller 114 includes a display 116 and a user interface 118. In other embodiments, remote controller 114 is wirelessly or otherwise coupled to other components (e.g., via light towers, generators, scene lights, winches, cable reels, rescue tools, and/or any other electrically, hydraulically, or pneumatically controlled piece of equipment used in fire-fighting or rescue operations) in the fire-fighting device 16 to control the operation of the respective components as well.

In the exemplary embodiment, base controller 110, tank 130, pump 120, aerial boom 54, first fluid monitor 12, and second fluid monitor 14 are each coupled to a fire-fighting device 16, such as a fire truck, used in system 100. In other embodiments, any of base controller 110, tank 130, pump 120, aerial boom 54, first fluid monitor 12 and/or second fluid monitor 14 may be independent of fire-fighting device 16 and/or may not be included in system 100. Fluid for use in fighting or suppressing a fire is stored in tank 130. In the exemplary embodiment, the fluid is water. In other embodiments, any other fluid, such as a foam-like substance, foaming agent, and/or any other flame retardant, may be contained in tank 130. Tank 130 is coupled via a tank supply line 138 to pump 120 to enable fluid to be selectively supplied to pump 120. A tank supply valve 134 coupled to tank supply line 138 provides control of a flow of fluid from tank 130 to pump 120. A tank recirculation line 136 enables fluid to be re-circulated from pump 120 to tank 130. A tank recirculation valve 132 coupled to tank recirculation line 136 provides selective control of a flow of fluid from pump 120 to tank 130.

A fluid source 140 is coupled to pump 120 via a source line 146. A control valve 142 is coupled to source line 146 to facilitate control of the flow of fluid from fluid source 140 to pump 120. In alternative embodiments, a pressure sensor (not shown) is coupled to source line 146 to enable an operating pressure of fluid in source line 146 to be measured. In the exemplary embodiment, fluid source 140 is a continuous fluid source embodied as a fire hydrant. In other embodiments, fluid source 140 may be any other source of fluid, such as a river, lake, or any other body of water. In the exemplary embodiment, pump 120 is operable to selectively fill tank 130 with fluid from fluid source 140.

A nozzle 156 is coupled to pump 120 via a first hose line 150. First hose line 150 is an elongated flexible hose line that enables a fire-fighter to extend and/or reposition first nozzle 156 a distance away from truck 102 and direct nozzle 156 at a desired target area. A first discharge valve 154 coupled to line 150 selectively controls a flow of fluid from pump 120 to first nozzle 156. A first pressure sensor 152 is coupled to first hose line 150 between first discharge valve 154 and nozzle 156 to enable an operating pressure of fluid flowing through first hose line 150 to be determined. In other embodiments, first hose line 150 may include additional pressure sensors (not shown) to enable fluid pressure at different portions of the line 150 to be determined.

First fluid monitor 12 is coupled to pump 120 via a first monitor line 160. First fluid monitor 12 includes a first fluid outlet 38 coupled in flow communication with first monitor line 160. A second discharge valve 164 coupled to line 160 selectively controls a flow of fluid from pump 120 to first fluid monitor 12. A second pressure sensor 162 is coupled to first monitor line 160 between second discharge valve 164 and first fluid monitor 12 to enable an operating pressure of fluid flowing through first monitor line 160 to be determined.

A first monitor control assembly 166 is communicatively coupled to base controller 110 (e.g., via either a wired or a wireless connection) and is operable to control a position of body 36. As shown in FIG. 7, in the exemplary embodiment, first monitor control assembly 166 includes a first monitor controller 168, a first monitor position sensor 165, a first drive system 48, and a first fluid outlet valve 167.

Second fluid monitor 14 is coupled to pump 120 via a second monitor line 170. Second fluid monitor 12 includes a second first fluid outlet 38 coupled in flow communication with second monitor line 170. A third discharge valve 174 coupled to line 170 selectively controls a flow of fluid from pump 120 to second monitor 176. A third pressure sensor 172 is coupled to second monitor line 170 between third discharge valve 164 and second monitor 176 to enable an operating pressure of fluid flowing through second monitor line 170 to be determined.

Although only three lines 150, 160, and 170 are illustrated, it should be understood that in other embodiments, more or less than three hose lines 150, 160, and 170 and associated valves, nozzles, and pressure sensors may be used. In the exemplary embodiment, pressure sensors 152, 162, and 172, are all transducers that measure pressure within respective lines 150, 160, 170. In alternative embodiments, pressure sensors 152, 162, and 172 each measure a flow rate of fluid in system 100. In further alternative embodiments, pressure sensors 152, 162, and/or 172 may be any other sensor that enables system 100 to function as described herein.

Referring to FIG. 7, in the exemplary embodiment, base controller 110, first monitor controller 168, and second monitor controller 176 may each generally be, or may include, any suitable computer and/or other processing unit, including, but not limited to, any suitable combination of computers, processing units, and/or the like, that may be operated independently, or in connection within, one another. In the exemplary embodiment, base controller 110 includes at least one processor 111 and an associated memory 113 configured to perform a variety of computer-implemented functions (e.g., performing the determinations, and functions disclosed herein). Likewise, first monitor controller 168 includes at least one processor 161 and an associated memory 163 and second monitor controller 176 includes at least one processor 171 and an associated memory 173. In other embodiments, control system 100 does not include independent monitor control assemblies 166, 176. In some such embodiments, base controller 110 is communicatively coupled directly with one or more of first monitor position sensor 165, first drive system 48, first fluid outlet valve 167, second monitor position sensor 175, a second drive system 49, second fluid outlet valve 177, boom position sensor 180, and boom drive system 182. As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) 113, 163, 173 of base controller 110, first monitor controller 168, and/or second monitor controller 176 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 113, 163, 173 may generally be configured to store suitable computer-readable instructions that, when implemented by the respective processors, configure or cause base controller 110, first monitor controller 168, and/or second monitor controller 176 to perform various functions described herein including, but not limited to, transmit and receive signals from the other of the base controller 110, first monitor controller 168, and/or second monitor controller 176, controlling an actuation state of valves, 132, 134, 142, 154, 157, 164, 167, 174, and/or 177 (i.e., moving valves between an opened position and a closed position), controlling a speed of pump 120, controlling various assemblies of first monitor control assembly 166 and/or second monitor control assembly 176, as described in greater detail below, and/or various other suitable computer-implemented functions.

In the exemplary embodiment, first discharge valve 154, second discharge valve 164, third discharge valve 174, tank supply valve 132, tank recirculation valve 134, and control valve 142 are each communicatively coupled to base controller 110 such that the operation of each valve is controlled by base controller 110. Moreover, each valve 132, 134, 142, 154, and 164 also includes at least one feedback sensor (not shown) that enables each valve 132, 134, 142, 154, and/or 164 to be continuously monitored, while each remains continuously communicatively coupled to base controller 110. In the exemplary embodiment, first monitor controller 168 and second monitor controller 176 are each communicatively coupled to base controller 110 via a wired connection, though in alternative embodiments one or more wireless connections are used.

In the exemplary embodiment remote controller 114 is communicatively coupled with base controller 110. As shown in the embodiment of FIGS. 1 and 2, the remote controller 114 may be coupled to the vehicle body 20. In other embodiments, additional remote controllers (not shown) may also be provided in either wired/or wireless (e.g., by one or more transceivers) communication with base controller 110. In one embodiment, remote controller 114 may be a mobile computing device, such as a tablet computer, that is separate from the vehicle 18. In another embodiment, remote controllers may be provided at one or more of nozzle 156, first fluid monitor 12, and/or second fluid monitor 14. For example, referring to FIG. 7, in some such embodiments, each of first monitor control assembly 166 and second monitor control assembly 176 may include a display and user interface communicatively coupled with first monitor controller 168 and second monitor controller 176, respectively.

Display 116 of remote controller 114 displays various selectors and/or controls (not shown) that may be variably selected to facilitate control and operation of system 100. More specifically, in the exemplary embodiment, display 116 displays controls that enable control of the operating pressure in first hose line 150, first monitor line 160, second monitor line 170, and/or any other hose lines included in system 100. Display 116 also provides a visual indication of the actual pressure in first hose line 150, first monitor line 160, second monitor line 170, and/or any other hose lines (not shown) in system 100. Display 116 may also provide a visual indicator of the current operative condition of valves 1132, 134, 142, 154, 157, 164, 167, 174, and/or 177 in system 100. Remote controller 114 may also include other visual and/or audible indicators such as, but not limited to, an LED fluid level indicator and/or warning indicator(s).

In the exemplary embodiment, display 116 may also enable control of valves 132, 134, 142, 154, 157, 164, 167, 174, 177, and/or operation of pump 120. More specifically, in the exemplary embodiment, display 116 is a touch sensitive display 116 that overlays a graphical display. Accordingly, in the exemplary embodiment, remote controller 114 may be operated by a user by pressing on predetermined locations defined on display 116. For example, and without limitation, display 116 may display an operating parameter (e.g., fluid pressure, flow rate, etc.) of fluid flow through nozzle 156 and may receive a user-requested fluid flow parameter (e.g., pressure, absolute flow rate, relative flow rate, etc.). In the exemplary embodiment, display 116 is an auto-dimming touchscreen that requires a user to purposely swipe it to access a line charge button (i.e., to transmit a command to open a specific discharge valve 154, 164, and/or 174). In the exemplary embodiment, any and/or all of the controls may be selectively controllable by a firefighter via remote controller 114.

In the exemplary embodiment, base controller 110 is operable to control operation of system 100 based on communications received from remote controller 114, the sensed state of valves 132, 134, 142, 154, 157, 164, 167, 174, and/or 177, and the operating pressures sensed by pressure sensors 152, 162, and/or 172 (collectively referred to as "inputs"). Based on inputs received by base controller 110, base controller 110 determines, based on predefined logic and/or based on a set of predefined rules (the two terms are referred to herein interchangeably) stored in the memory 113, control operation of system 100. The set of rules broadly define the conditions and/or operating limitations for system 100. For example, the predefined logic may indicate maximum operating pressures for lines 150, 160 and/or 170, a maximum or minimum operating speed of pump 120, a maximum or minimum operating pressure in source line 146, and/or a maximum or minimum amount of fluid to be maintained in tank 130. Such rules may also define the operational responses of base controller 110 for system 100, based on inputs to system 100.

For example, when base controller 110 receives a communication from a remote controller 114 requesting an increase in fluid pressure in first monitor line 160, base controller 110 controls operation of system 100 based on the predefined logic. In such an example, the set of rules may cause second discharge valve 164 to be opened until a desired operating pressure is sensed by second pressure sensor 162. In the exemplary embodiment, measured operating values fall within a predefined tolerance (e.g., ±5 psi). For example, the desired operating pressure may include a user-requested operating pressure, or a preset pressure stored in memories 113 and/or 163. If the desired pressure is not attained, base controller 110 causes the operating speed of pump 120 to increase until the desired operating pressure is sensed by second pressure sensor 162.

In another example, base controller 110 may receive a communication from remote controller 114 requesting that fluid flow to first fluid monitor 12 be ceased. In response, base controller 110 controls operation of system 100 based on inputs received and based on predefined logic. The predefined logic causes second discharge valve 164 to close after receiving such a communication from remote controller 114 and to reduce the operating speed of pump 120 such that the operating pressure sensed by first pressure sensor 152 at first nozzle 156 remains substantially constant as fluid is being pumped through first hose line 160. Additionally or alternatively, the predefined logic may cause an additional valve at fire-fighting device 16 (e.g., a relief valve) coupled in flow communication with pump 120 to open to reduce the discharge pressure of the pump 120 without changing the operating speed of pump 120. If fluid is not being channeled through first monitor line 160, the operating speed of pump 120 is reduced to idle, and tank recirculating valve 132 and tank supply valve 134 are each opened to enable fluid to be recirculated through tank 130. The predefined logic may also cause source valve 142 to close after a level of fluid in tank 130 has reached a predefined threshold (e.g., a predefined capacity of tank 130).

In the exemplary embodiment, base controller 110 is further operable to control at least one of first drive system 48, second drive system 49, and/or boom drive system 182 to control a position of first fluid monitor 12 and/or second fluid monitor 14. In particular, base controller 110 is configured to position first fluid outlet 38 and second first fluid outlet 38 based on a user-requested deployed position. For example, after arriving on a fire scene, to request one of monitors 12, 14 be deployed to a target area, a user may first select a desired fluid monitor to deploy from a list of available fluid monitors 12, 14 on display 116.

Figure 8:
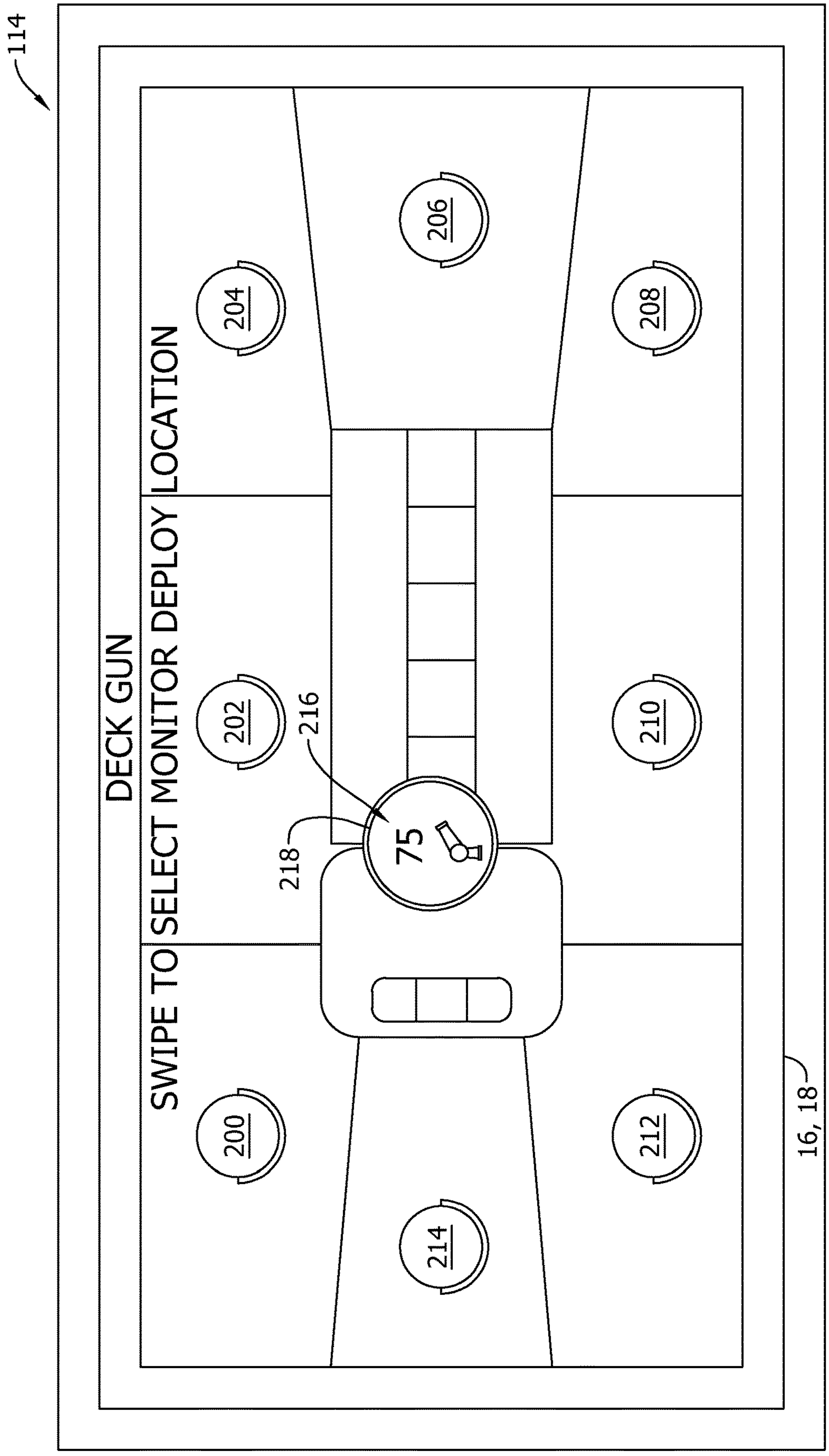
FIG. 8 is a top plan view of an example remote controller for use with the fire-fighting control system of FIG. 6 showing a first graphical display.

As shown in FIG. 8, after selecting a fluid monitor (e.g., first fluid monitor 12 or "deck gun" in FIG. 8), remote controller 114 displays a plurality of target zones 200-214, each corresponding to an area around vehicle 18 (FIG. 3), and prompts the user to select one of the displayed target zones 200-214. A fluid pressure indicator 216 displays a fluid pressure in the selected line sensed at the corresponding pressure sensor 162 (FIG. 6). Referring back to FIG. 7, after receiving a user selected zone from the plurality of target zones 200-214, remote controller 114 transmits the user selected zone to base controller 110, which controls first fluid monitor 12 to move to the deployed configuration 15. In particular, base controller 110 transmits a control signal to first monitor controller 168, which controls first drive system 48 to rotate first body portion 40 and second body portion 42 such that the first fluid outlet 38 of first fluid monitor 12 is oriented to direct fluid flow towards a target area corresponding to the user-selected target zone. As an example, when the target zone 214 in FIG. 8 is selected, base controller 110 controls first fluid monitor 12 to move from the stowed position (FIG. 1) to the deployed position, with the first fluid outlet 38 oriented to face front side of the vehicle 18 (e.g., as shown in FIG. 2).

In the exemplary embodiment, first monitor control assembly 166 and second monitor control assembly 176 each control movement of first fluid monitor 12, second fluid monitor 14, and boom 54 based on position sensors 165, 175, 180. For example, first monitor position sensor 165 is configured to detect a rotational position of first body portion 40 and second body portion 42 of first fluid monitor 12. Second monitor position sensor 175 is configured to detect a rotational position of first body portion 66 and second body portion 68 of second fluid monitor 14. Boom position sensor 180 is configured to detect a rotational position of turntable 56, an extension position of boom 54 (i.e., how far boom 54 is extended), and an orientation of boom 54 (e.g., by detecting an extension position of lift 25).

In some embodiments, the position sensors 165, 175, 180 may include motor and/or actuator position sensors that measure an angular position of the motor and/or actuator. The position sensors 165, 175, 180 may include an encoder, a hall effect sensor, a potentiometer, etc. Moreover, although depicted schematically as single sensors, it should be understood that first monitor position sensor 165, second monitor position sensor 175, and/or boom position sensor 180 may each be a sensor assembly formed of a plurality of sensors. For example, in the example embodiment, first fluid monitor 12 may include a first position sensor that detects a position of the first drive 50 that rotates the first body portion 40 relative to mount 34, and a second position sensor that detects a position of the second drive 52 that rotates second body portion 42 relative to first body portion 40. In other embodiments, the position sensors may include any suitable sensors that enable the monitor control assemblies 166 to function as described herein.

In some embodiments, base controller 110 and/or first monitor controller 168 stores a default discharge angle $\alpha$ (shown in FIG. 5) of the second body portion 42 in the deployed configuration 15 (shown in FIG. 2). After receiving the user-requested target area, the first body portion 40 is rotated to face the corresponding target area and the second body portion 42 is rotated to the default discharge angle $\alpha$. As an example, in one embodiment, the default discharge angle $\alpha$ is about 45° relative to the vertical Y-axis in FIG. 1, though in other embodiments, any suitable default discharge angle $\alpha$ may be used. In another embodiment, base controller 110 may determine the discharge angle $\alpha$ of second body portion 42 based on one or more user selected parameters, such as a relative distance of a target area from vehicle 18 as described in greater detail below.

As another example, where second fluid monitor 14 is requested to deploy, remote controller 114 may similarly display a plurality of target zones 200-214 (FIG. 8) and receive a user-requested zone. In response, base controller 110 controls boom drive system 182 to move boom 54 from the retracted position 21 to an extended position 23 (e.g., as shown in FIG. 2) and may rotate turntable 56. Base controller 110 further instructs second monitor control assembly 176 to move second fluid monitor 14 on boom 54 such that second first fluid outlet 38 is oriented to discharge fluid toward the target area corresponding to user-selected target zone. At least one of base controller 110 and second monitor control assembly 176 may store a default discharge angle $\alpha$, boom orientation (e.g., relative to the vertical Y axis shown in FIGS. 1 and 2), and/or boom extension associated with the deployed configuration 17 (shown in FIG. 2). In such embodiments, in response to receiving a request to move second fluid monitor 14 to the deployed configuration 17 and aimed at a user selected target zone, base controller instructs second monitor control assembly 176 to rotate turntable 56, such that second fluid monitor 14 is oriented toward the target area associated with the user-selected target zone. Base controller 110 further instructs second monitor control assembly 176 and/or boom drive system 182 to extend boom 54 to the default boom extension and to raise boom 54 to the default boom orientation. Base controller further instructs second drive 52 to rotate second body portion 68 of second fluid monitor 14 into the default discharge angle $\alpha$.

In some embodiments, after the base controller 110 controls the user-selected monitor to deploy to the user-selected target area, base controller 110 may also determine whether the user-selected fluid monitor is in the deployed configuration 15, 19 with the flow outlet oriented to direct fluid flow to the target area, prior to opening at least one of the corresponding valves 164, 167 and/or 174, 177. If base controller 110 determines that the user selected fluid monitor is not in the deployed configuration 15, 19 (e.g., if it is currently deploying or is unable to reach the deployed configuration due to a mechanical failure), base controller 110 prevents fluid flow from the selected fluid monitor.

For example, as described above, in response to receiving a user request to deploy first fluid monitor 12 to zone 8 (FIG.

Figure 9:
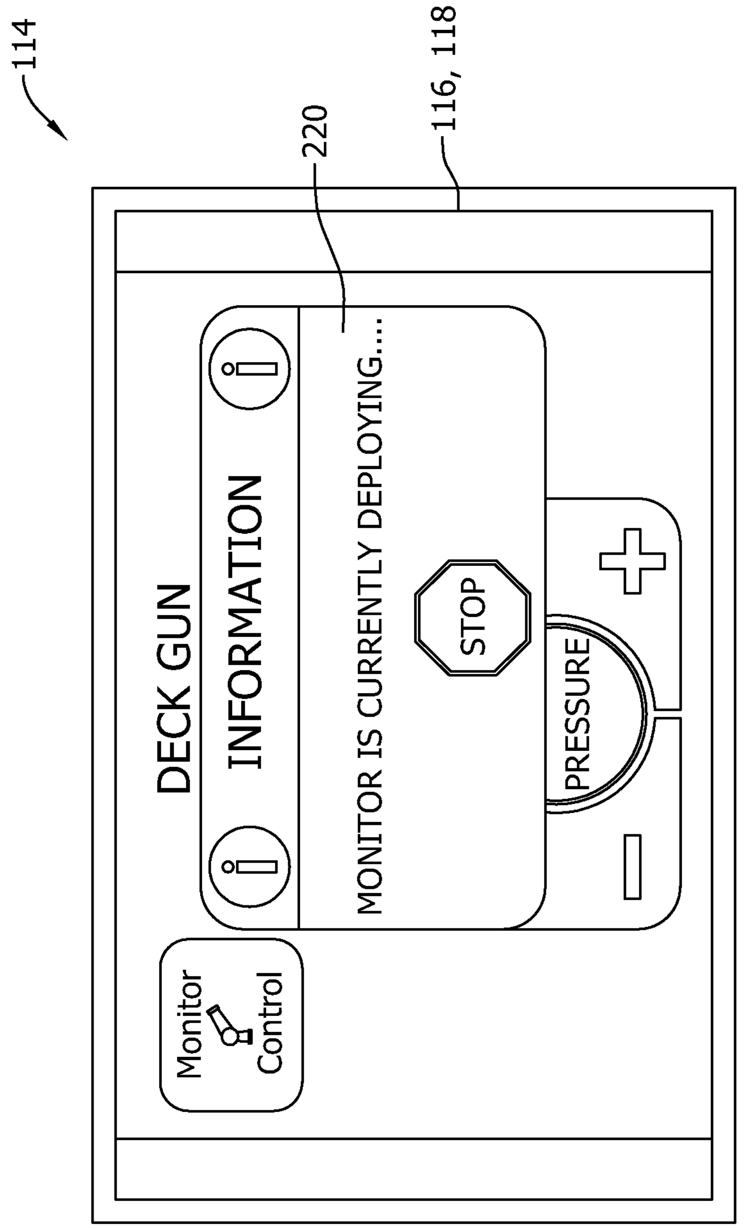
FIG. 9 is a top plan view of the example remote controller shown in FIG. 8 showing a second graphical display.

8), a user may request a valve opening at remote controller 114 to discharge fluid from first fluid monitor 12. If, based on readings from first monitor position sensor 165, base controller 110 determines that first fluid monitor 12 hasn't reached the deployed configuration 15, base controller 110 may deny the request to open at least one of second discharge valve 164 and/or first outlet valve 167 (FIG. 2) to prevent fluid discharge from first fluid outlet 38 before first fluid monitor 12 is in the deployed configuration 15. Additionally, base controller 110 may further instruct remote controller 114 to display an error message 220, as shown in FIG. 9, indicating that the monitor is currently deploying and will not be permitted to discharge until it has reached the deployed configuration 15. Moreover, while discharge from the deploying monitor 12, 14 may be prevented, in the exemplary embodiment, control system 100 enables charging (i.e., providing pressurized fluid to) the corresponding fluid line of a monitor 12, 14 while the monitor 12, 14 is deploying. Moreover, an operator may adjust, by the remote controller, the requested pressure at a monitor 12, 14 while the monitor 12, 14 is deploying. As an example, as shown in FIG. 8, prior to deploying monitor 12 display 116 shows a default fluid pressure 216 for monitor 12 and provides a colored boundary 218 around the default fluid pressure 216 to indicate that the line has been charged to the preset pressure. A user may then adjust the charged pressure while first fluid monitor 12 is deploying, without fluid being discharged from the fluid monitor 12.

As another example, where second fluid monitor 14 is deployed, base controller 110 may determine a position of second fluid monitor 14 based on readings received from second monitor position sensor 175 and boom position sensor 180. Based on the determined position, base controller 110 determines whether second fluid monitor 14 is in the deployed configuration 17 (shown in FIG. 2) and prevents opening of at least one of valve 174 and/or 175 until second fluid monitor 14 is determined to be in the deployed configuration 17.

In another embodiment, monitor controllers 168, 178 may independently determine whether their respective monitors 12, 14 are in the deployed configuration 15, 19 and control the corresponding fluid outlet valves 167, 177 based on the determination. As an example, in response to receiving a user request to deploy first fluid monitor 12 to zone 8 (FIG. 8), a user may request opening of first fluid outlet valve 167 at first fluid monitor 12. In response, first monitor controller 168 may determine, based on first monitor position sensor 165, whether first fluid monitor 12 is in the deployed configuration 15. If first monitor controller 168 determines that first fluid monitor 12 hasn't reached the deployed configuration 15, first monitor controller 168 may deny the request to open the first fluid outlet valve 167 to prevent fluid discharge from first fluid outlet 38.

Figure 10:
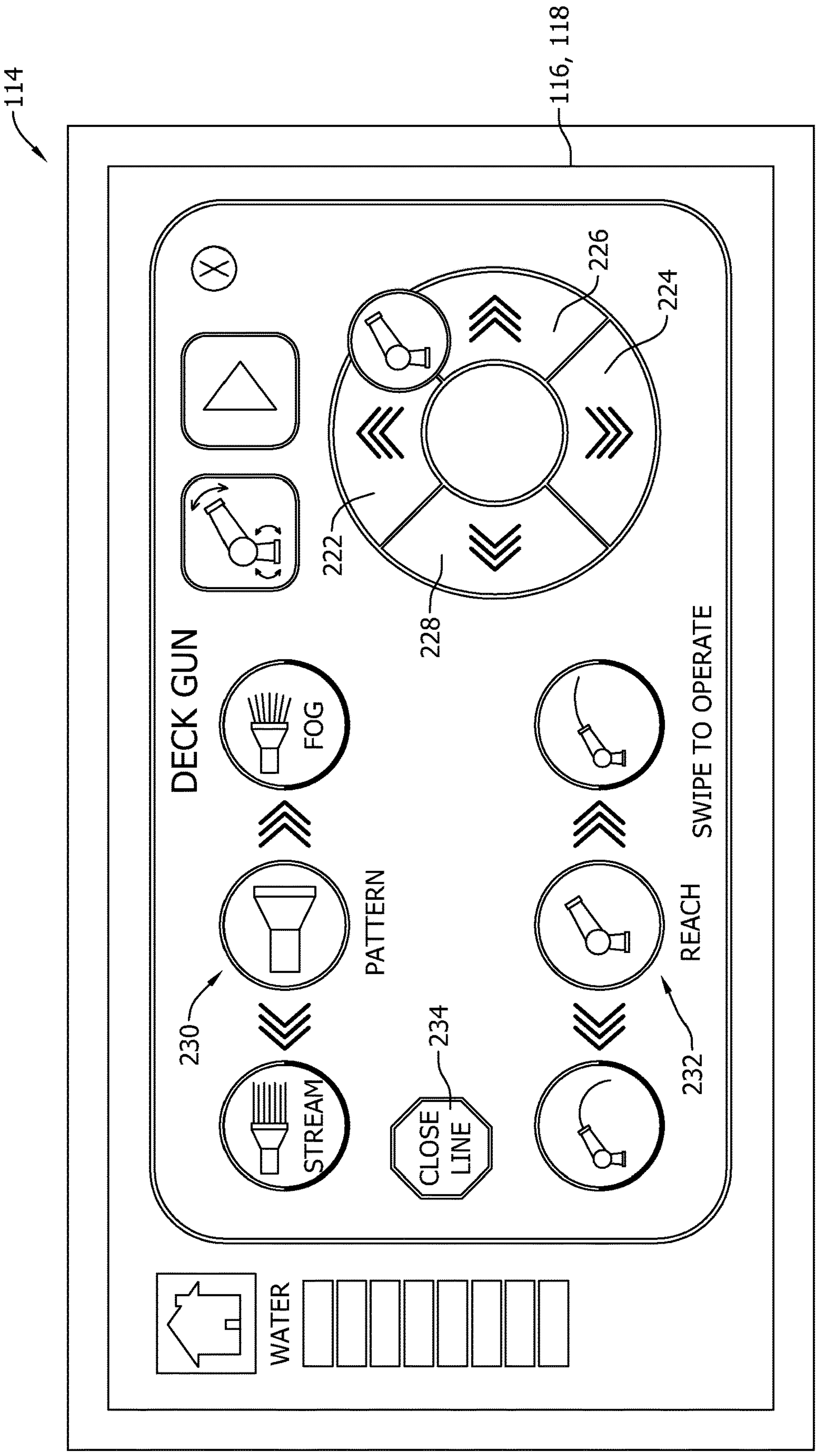
FIG. 10 is a top plan view of the example remote controller shown in FIG. 8 showing a third graphical display.

Referring to FIG. 10, in the exemplary embodiment, remote controller 114 is further configured to display control icons 222 of first fluid monitor 12 and receive user inputs thereon to control settings of first fluid monitor 12. In particular, in the exemplary embodiment, display 116 includes monitor positioning control icons 222-228, spray pattern control icons 230, reach control icons 232, and a valve control icon 232.

Monitor positioning control icons 222-228 include an up icon 222, a down icon 224, a left icon 226, and a right icon 228. The up/down icons 222, 224 are used to control the discharge angle $\alpha$ (shown in FIG. 5) of first fluid monitor 12 and the left/right icons 226, 228 control discharge direction of first fluid monitor 12. The spray pattern control icons 230 control a spread or "nozzle pattern" of fluid flow from flow outlet to adjust the spread of a spray of fluid exiting first fluid outlet 38 between a dispersed spray pattern (also referred to as a "fog" pattern) and a concentrated spray or straight stream. The reach control icons 232 may be used to control the distance of the resulting fluid flow exiting first fluid outlet 38. Base controller 110 may control fluid flow to first fluid monitor 12 in response to the user adjusting the reach icons 232. For example, base controller 110 may increase the reach at first fluid monitor 12 by operating pump 120 and/or controlling one or more of valves 154, 157, 167, 167, 174, and/or 177 to increase fluid pressure in first monitor line 160 (FIG. 7). In the exemplary embodiment, display 116 further displays a valve control icon 234. When discharge valve 164 and/or fluid outlet valve 167 are open, valve control icon 234 is a "Close Line" icon, as illustrated in FIG. 10. In response to a user selecting the "Close Line" valve control icon 234, base controller 110 causes at least one of valves 164, 167 to close in response. When one or more of discharge valve 164 and fluid outlet valve 167 are closed, valve control icon 234 may be an "Open Line" icon (not shown). In response to a user selecting the "Open Line" icon, base controller 110 causes at least one of valves 164, 165 to open in response to permit fluid flow from first fluid outlet 38.

Referring back to FIGS. 6 and 7, in the exemplary embodiment base controller 110 is further configured to control operation of fire-fighting system 10 based on the detected and/or determined positions of first fluid monitor 12 and/or second fluid monitor 14. For example, base controller 110 may be configured to determine a trajectory of fluid flow from monitors 12, 14 based on the detected positions from the corresponding position sensors 165, 175, 180. As an example, a user controlling a first fluid monitor 12 may request a fluid flow from first fluid monitor 12 to reach a target area spaced from the vehicle 18. In response, base controller 110 may determine an expected fluid trajectory from first fluid monitor 12 based on at least one of the detected positions of first fluid monitor 12 and the sensed fluid pressure in first monitor line 160 by pressure sensor 162. If the expected fluid trajectory will not reach the user requested area, base controller 110 may further determine a position of first fluid monitor 12 and/or fluid pressure in first monitor line 160 having an expected fluid trajectory reaching the target area and control one or more of first drive system 48, valves 164, 167, and/or pump 120 based on the determination to generate a fluid flow reaching the target area.

In another embodiment, base controller 110 may designate a "safe zone" around the vehicle 18. For example, referring to FIG. 3, the safe zone may include a perimeter boundary in the X-Z plane extending around vehicle body 20. In such embodiments, base controller 110 may prevent fluid discharge from monitors 12, 14 in response to determining that the expected fluid trajectory will direct fluid into the safe-zone. Additionally, or alternatively, base controller 110 may also prevent a user from moving monitors 12, 14 to a position in which the expected fluid trajectory would direct discharge fluid within the safe-zone.

Figure 11:
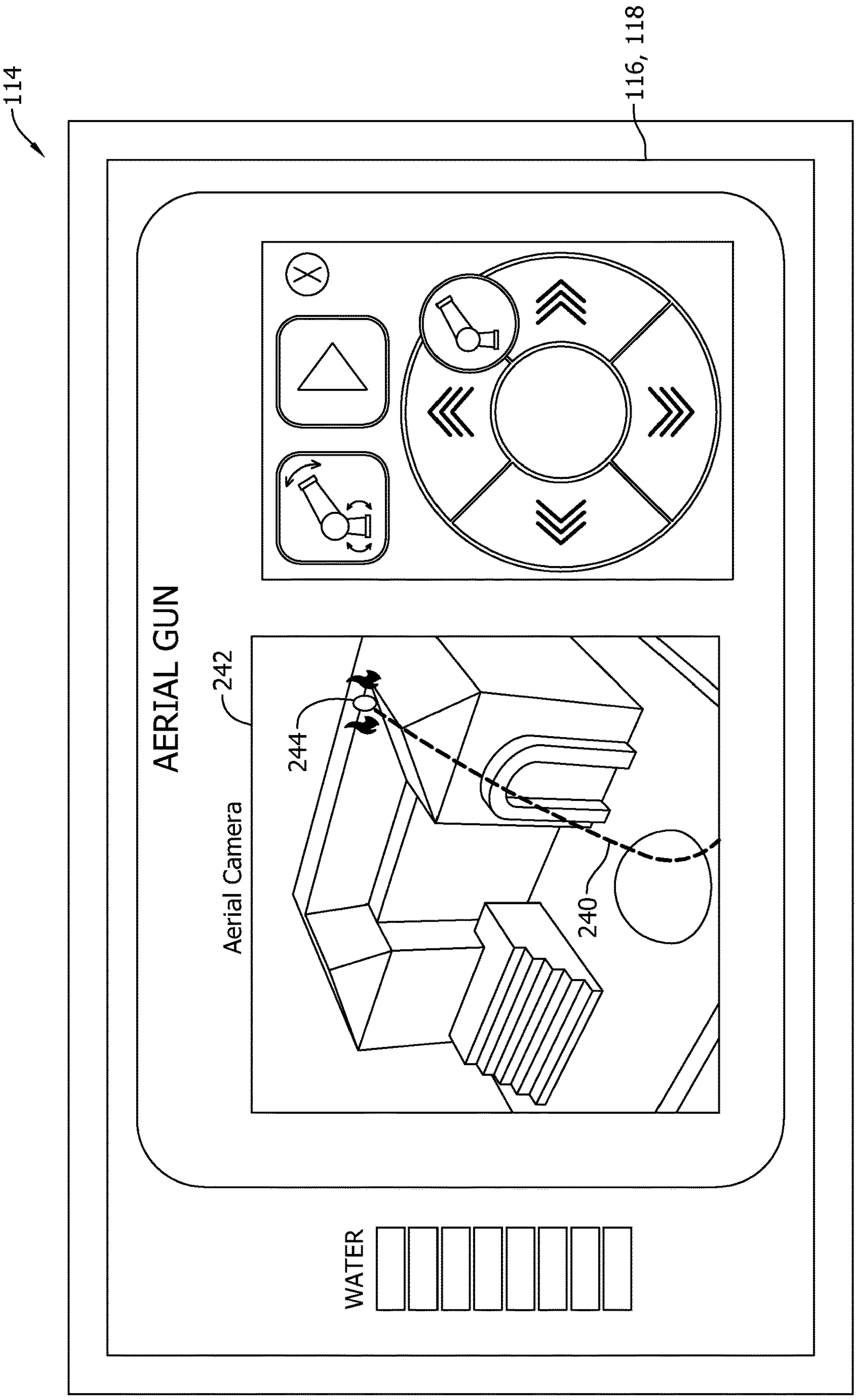
FIG. 11 is a top plan view of the example remote controller shown in FIG. 8 showing a fourth graphical display.

Moreover, base controller 110 may determine an expected fluid trajectory from second fluid monitor 14 based on the detected positions from second monitor position sensor 175 and boom position sensor 180, and further based on the pressure sensed at third pressure sensor 172. In some such embodiments, base controller 110 may map a position of second fluid monitor 14 in three-dimensional space around the vehicle 18 based on the detected positions. Moreover, a camera (not shown) may be coupled to second end 60 end of boom 54. Such a camera may be wirelessly coupled to base controller 110 and/or to remote controller such that images captured by the camera may be wirelessly communicated to base component 110 and/or remote controller 114 for viewing by a user remote from the camera. As shown in FIG. 11, in some such embodiments, base controller 110 may map an expected trajectory 240 and an expected target hit point 244 from second fluid monitor 14 onto the camera video feed 242 and display them on the remote controller 114. In such embodiments, base controller 110 is configured to map the expected trajectory prior to opening valves 174 and/or 177 such that an operator may preview the resulting fluid flow from the current line settings before the fluid is discharged. The base controller 110 may also update the expected trajectory 240 and target hit point 244 based on setting adjustments by the operator at remote controller 114, such as changing one of an orientation and/or rotation of second fluid monitor 14, a position of boom 54, and/or fluid pressure in second monitor line 170.

Moreover, in the example embodiment, base controller 110 may analyze video feed 242 to determine whether a person and/or animal is within and/or near the expected trajectory 240 or expected target hit point 244 of fluid flow from the monitor 14. For example, in some embodiments, base controller 110 may detect human and/or animal movement within video feed 242. In another embodiment, base controller 110 may access an image recognition software stored on memory 113 to determine whether the images in video feed include a person and/or animal. If base controller 110 determines that a person and/or animal is within and/or near the expected trajectory 240 or expected target hit point 244 a warning to the operator may be provided on the display 116. Moreover, in some embodiments, base controller 110 further prevents fluid discharge from the fluid monitor 14 if a person and/or animal is detected in the video feed 242. In some such embodiments, the operator may override the warning message to proceed with discharging fluid from the fluid monitor 14.

Although certain aspects of the disclosure are described with reference to user-requested fluid pressures, it should be understand that other user-requested parameters of fluid, such as flow rates (absolute and/or relative), may be used in addition to or as an alternative to a user-requested fluid pressure in the systems, methods, control algorithms, and techniques described herein.

The above-described embodiments provide a cost-effective and reliable means of improving the control of a fire-fighting device. More specifically, the exemplary systems and methods described herein overcome disadvantages of known fire-fighting control systems by enabling remote control of a monitor position and of fluid pressure to the monitor by a firefighter. As such, the systems and methods described herein allow for enhanced control of fluid monitors and enable accurate positioning and control over a fluid discharge from the monitors. Moreover, the systems and methods described herein enable efficient operation of fire-fighting devices by eliminating the need for an operator to be stationed near the monitors and/or the fire-fighting device to control the monitors. Moreover, the embodiments described herein also enable an automated deploy of monitors of a fire-fighting system. For example, some embodiments described herein enable a fire-fighter to select a designated target area around the pumper and automatically deploy the monitor in response. As a result, the systems and methods described herein facilitate increasing the efficiency of the fire-fighting control system in a cost-effective and reliable manner, while also improving firefighter safety. Additionally, some embodiments described herein prevent fluid discharge from the fluid monitor until the monitor is determined to be in a deployed configuration. Accordingly, the systems described herein improve firefighter safety and reduce the potential for human error, such as the potential to release fluid from the fluid monitor before the fluid monitor is in a deployed position.

Exemplary embodiments of systems and methods for use in controlling monitors of a fire-fighting system are described above in detail. The methods and apparatus are not limited to the specific embodiments described herein, but rather, components of systems and/or steps of the methods may be utilized independently and separately from other components and/or steps described herein. For example, the systems and methods may also be used in combination with other fire-fighting systems and methods, and are not limited to practice with only the fire-fighting system as described herein. Rather, the exemplary embodiment can be implemented and utilized in connection with many other fire-fighting devices.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fire-fighting system comprising:

a fluid monitor comprising a fluid outlet, said fluid monitor being selectively moveable between a stowed configuration and a deployed configuration; and a controller configured to:

receive a request to direct a fluid flow from said fluid monitor towards a desired target area; and in response to receiving the request:

determine a target position of said fluid monitor for the deployed configuration, the target position being a position of said fluid monitor at which an expected trajectory of discharge of fluid from said fluid monitor reaches the target area;

transmit a control signal instructing said fluid monitor to move to the target position;

detect, after transmitting the control signal, a current position of said fluid monitor:

control said fluid monitor to prevent discharge of fluid when the detected current position of said fluid monitor is different from the target position; and control said fluid monitor to discharge fluid when the detected current position of said fluid monitor is equal to the target position.

2. The system of claim 1 further comprising a drive operatively coupled to said fluid monitor for selectively moving said fluid monitor, wherein said controller is communicatively coupled to the drive to cause said drive to move said fluid monitor between the stowed and deployed configurations.

3. The system of claim 1 further comprising:
a pump; and
a valve controlling fluid flow between said pump and said fluid outlet, wherein said controller controls operation of said valve.

4. The system of claim 3, wherein said controller is configured to:
receive a user-requested fluid pressure; and
control operation of at least one of said pump and said valve to provide the user-requested fluid pressure at the target area.

5. The system of claim 1 further comprising:
a pump; and
a valve fluidly coupled between said pump and said fluid outlet, said valve moveable between an open position, in which fluid may flow from said pump out of said fluid outlet, and a closed position, in which fluid is prevented from flowing between said pump and said fluid outlet, wherein said controller is configured to:
determine whether the detected current position of said fluid monitor is equal to the target position; and
control the valve to move from the closed position to the open position in response to determining that the detected current position of said fluid monitor is equal to the target position.

6. The system of claim 1 further comprising:
a pump; and
a valve coupled between said pump and said fluid outlet, said valve moveable between an open position, in which fluid may flow from said pump out of said fluid outlet, and a closed position, in which fluid is prevented from flowing between said pump and said fluid outlet, wherein said controller is configured to:
determine whether said valve is in the closed position;
determine whether the detected current position of said fluid monitor is equal to the target position; and
in response to determining that the detected current position of said fluid monitor is not equal to the target position, prevent the valve from moving to the open position.

7. The system of claim 1 further comprising a fire-fighting vehicle comprising a roof, said fluid monitor is rotatably mounted on the roof and moveable to direct the fluid outlet approximately 360° about the roof.

8. The system of claim 7, wherein said controller comprises a memory storing a plurality of target zones each corresponding to a respective target area spaced circumferentially about the fire-fighting vehicle, wherein the request to direct fluid flow from said fluid monitor towards a target area includes a target zone selected by a user from the plurality of target zones, and wherein said controller is further configured to:
move the fluid monitor to direct the fluid outlet towards the target area corresponding to the target zone selected by the user.

9. The system of claim 1 further comprising a fire-fighting vehicle comprising a body and a boom rotatably coupled to said body, said boom comprising a distal end that is moveable outward from said body, wherein said fluid monitor is coupled to said distal end of said boom.

10. The system of claim 1 further comprising a sensor coupled to said fluid monitor and in communication with said controller for detecting the current position of said fluid monitor.

11. A controller for controlling a fire-fighting system including a fluid monitor, the fluid monitor being moveable between a stowed configuration and a deployed configuration, said controller configured to:
receive a request to direct a fluid flow from the fluid monitor towards a desired target area; and
in response to receiving the request:
determine a target position of the fluid monitor for the deployed configuration, the target position being a position of the fluid monitor at which an expected trajectory of discharge of fluid from the fluid monitor reaches the target area;
transmit a control signal instructing the fluid monitor to move to the target position;
detect, after transmitting the control signal, a current position of the fluid monitor;
control the fluid monitor to prevent discharge of fluid when the detected current position of the fluid monitor is different from the target position; and
control the fluid monitor to discharge fluid when the detected current position of the fluid monitor is equal to the target position.

12. The controller of claim 11, wherein the controller is communicatively coupled to a valve controlling fluid flow out of the fluid monitor, the valve being moveable between an open position and a closed position, and wherein said controller is configured to:
control the valve to be in the open position when the detected current position of the fluid monitor is equal to the target position; and
control the valve to be in the closed position when the detected current position of the fluid monitor is different from the target position.

13. The controller of claim 11, wherein said controller comprises a memory storing a plurality of target zones each corresponding to a respective target area spaced circumferentially about a fire-fighting vehicle, wherein the request to direct fluid flow towards a target area includes a target zone selected by a user from the plurality of target zones, and wherein said controller is further configured to:
move the fluid monitor such that a fluid outlet of the fluid monitor is directed toward the target area corresponding to the target zone selected by the user.

14. The controller of claim 11, wherein said controller is coupled in communication with a position sensor for detecting the current position of the fluid monitor.

15. The controller of claim 14, wherein said controller is communicatively coupled to a pressure sensor for detecting a fluid pressure of fluid flowing to the fluid monitor, and wherein said controller is configured to determine the expected trajectory of discharge of fluid based on the detected fluid pressure and the detected position of the fluid monitor.

16. A method of controlling a fluid monitor of a fire-fighting device, the fluid monitor being moveable between a stowed configuration and a deployed configuration, said method comprising:
receiving, at a controller, a request for a fluid flow from the fluid monitor towards a desired target area; and
in response to receiving the request:
determining a target position of the fluid monitor for the deployed configuration, the target position being a position of the fluid monitor at which an expected trajectory of discharge of fluid from the fluid monitor reaches the target area;

transmitting a control signal instructing the fluid monitor to move to the target position;

detecting, after transmitting the control signal, a current position of the fluid monitor;

controlling the fluid monitor to prevent discharge of fluid when the detected current position of the fluid monitor is different from the target position; and controlling the fluid monitor to discharge fluid when the detected current position of the fluid monitor is equal to the target position.

17. The method of claim 16, wherein the controller is communicatively coupled to a valve controlling fluid flow out of the fluid monitor, the valve being moveable between an open position and a closed position, said method further comprising:

controlling the valve to be in the open position when the detected current position of the fluid monitor is equal to the target position; and controlling the valve to be in the closed position when the detected current position of the fluid monitor is different from the target position.

18. The method of claim 16 further comprising:

receiving, at the controller, a user-selected target zone of a plurality of target zones, each target zone of the plurality of target zones corresponding to a respective target area located circumferentially about a fire-fighting vehicle; and moving the fluid monitor such that a fluid outlet of the fluid monitor is directed toward the target area corresponding to the user-selected target zone.

19. The method of claim 16 further comprising:

detecting, by a first sensor, the current position of the fluid monitor;

detecting, by a second sensor, a fluid pressure of the fluid flowing to the fluid monitor;

determining the expected trajectory of discharge of fluid from the fluid monitor based on the detected current position and the detected fluid pressure; and controlling the fluid monitor based on the determined expected trajectory.

* * * * *